US009652468B2

(12) United States Patent
Bshara et al.

(10) Patent No.: US 9,652,468 B2
(45) Date of Patent: May 16, 2017

(54) IN-BAND DE-DUPLICATION

(71) Applicant: Annapurna Labs Ltd., Yoekneam (IL)

(72) Inventors: Nafea Bshara, San Jose, CA (US); Leah Shalev, Zichron Yaakov (IL); Erez Izenberg, Tel Aviv (IL); Zorik Machulsky, Gesher Haziv (IL); Ron Diamant, Nesher (IL)

(*) Notice: Subject to any disclaimer, the term of this patent is extended or adjusted under 35 U.S.C. 154(b) by 551 days.

(21) Appl. No.: 14/108,458

(22) Filed: Dec. 17, 2013

(65) Prior Publication Data

US 2015/0169613 A1 Jun. 18, 2015

(51) Int. Cl.
*G06F 17/30* (2006.01)
*G06F 7/00* (2006.01)

(52) U.S. Cl.
CPC .................. *G06F 17/30159* (2013.01)

(58) Field of Classification Search
CPC ............ G06F 17/30159; G06F 3/0641; G06F 17/30156
See application file for complete search history.

(56) References Cited

U.S. PATENT DOCUMENTS

| | | | | |
|---|---|---|---|---|
| 7,660,865 B2 * | 2/2010 | Hulten | ................. | H04L 12/585 709/206 |
| 8,174,412 B2 * | 5/2012 | Reddy | ................. | G06F 11/1453 341/51 |
| 8,407,193 B2 * | 3/2013 | Gruhl | .................... | G06F 3/0608 707/693 |
| 8,521,705 B2 * | 8/2013 | Jayaraman | ............ | G06F 3/0641 707/687 |
| 8,583,909 B2 * | 11/2013 | Cha | ..................... | H04N 21/4432 713/1 |
| 8,682,869 B2 * | 3/2014 | Baldwin | ........... | G06F 17/30156 707/692 |
| 9,141,506 B2 * | 9/2015 | Stevens | .................. | H04L 43/12 |
| 2012/0257626 A1 * | 10/2012 | McGhee | ............. | H04L 45/7453 370/392 |

\* cited by examiner

*Primary Examiner* — Jeffrey A Burke
(74) *Attorney, Agent, or Firm* — Kilpatrick Townsend & Stockton LLP

(57) ABSTRACT

A method for in-band de-duplication, the method may include receiving by a hardware accelerator, a received packet of a first sequence of packets that conveys a first data chunk; applying a data chunk hash calculation process on the received packet while taking into account a hash calculation result obtained when applying the data chunk hash calculation process on a last packet of the first sequence that preceded the received packet; wherein the calculating of the first data chunk hash value is initiated before a completion of a reception of the entire first data chunk by the hardware accelerator.

22 Claims, 11 Drawing Sheets

IN-BAND DE-DUPLICATION

BACKGROUND

Data deduplication is a technique for eliminating large sections of redundant data. It is used to improve storage utilization. In a nut shell, if a data chunk is already stored in a storage device then a later request to store the same data chunk in the storage device will result in storing a link (or other retrieval information) to the already stored data chunk instead of storing both (identical) data chunks.

Identical data chunks are detected by applying a hash calculation process to provide a hash value (called fingerprint) of a data chunk (received data chunk) that is requested to be written to the storage device and by comparing the hash value of the received data chunk to hash values of data chunks already stored in the storage device.

Data deduplication was traditionally associated with backup storage, with relaxed performance requirements. Today, when using flash memories that have limited lifespan (in terms of program and erase cycles) data deduplication is regarded as an essential process.

Furthermore, flash memories have high throughput and low latency and thus data deduplication must be very quick in order utilize these qualities of flash memories.

Data deduplication can be performed in a post-processing manner in which the entire received data chunk is first stored in a buffer, followed by having its hash value calculated (after it is completely stored in the buffer) and then a comparison is made (between hash values) to determine whether the received data chunk is already stored in the storage device.

FIG. 1 illustrates a prior art system 10 and process for performing post-processing data de-duplication.

The system 10 includes a front end interconnect engine 20, a memory module such as random access memory (RAM) 80, hash engine 30 and central processing unit (CPU) 50. These element are electrically coupled to each other by bus (or any link or network) 40. System 10 is coupled to initiator 90 and back-end flash interface engine 70, wherein the latter is coupled to and flash memory 60.

RAM 80 stores a buffer 81, a completion queue 83 for storing indicators about the completion of writing received data chunks to buffer 81, a received data chunk hash value buffer 84, and a hash lookup table 82 that stores hash values of data chunks that are already stored in flash memory 60.

The back-end flash interface engine 70 provided an interface between the flash memory 60 and system 10.

The hash engine 30 may be included in (implemented by) CPU 50 but may be separate from CPU 50.

Front-end interconnect engine 20 receives packets from initiator 90 which can be (or be connected to) any computer that wishes to write to flash memory 60. Flash memory 60 is a storage device that is connected to back-end flash interface engine 70.

A typical write process is illustrated by various dashed arrows in FIG. 1. It may include:
  Receiving by the front end interconnect engine 20 a write command (a request to write a received data chunk to flash memory 60) from an initiator 90.
  Allocating buffer 81 in RAM 80.
  Sending data from an initiator memory to buffer 81.
  Once the entire received data chunk is stored in buffer 81—updating a completion flag in completion queue 83.
  Accessing, by hash engine 30, RAM 80 to read the received data chunk from buffer 81 and calculating the hash value of the received data chunk. The accessing might include multiple access iterations.
  Storing the hash value of the received data chunk in received data chunk hash buffer 84.
  Reading, by CPU 50, the received data chunk hash and trying to find a matching hash value in the hash lookup table 82.
  If a match is not found—sending the received data chunk to the back-end flash interface engine 70 and from there to flash memory 60. In addition, storing the received data chunk hash value in the hash lookup table 82.
  If a match is found then storing a mapping from a received data chunk logical address to the physical address of the already stored matching data chunk.

The accessing, by hash engine 30, RAM 80 to read the received data chunk from buffer 81 usually involves multiple access iterations. It adds extra load on RAM 80, increases RAM 80 latency and thereby reduces the throughput of other entities (such as CPU 50) that may request to access RAM 80. For example, lookup of hash fingerprints and mappings (done by CPU with highly random accesses to memory) can be dramatically slowed down.

SUMMARY

According to an embodiment of the invention there may be provided methods and systems for in-band de-duplication.

According to an embodiment of the invention there may be provided a method for in-band de-duplication, the method may include calculating a first data chunk hash value, wherein content of the first data chunk is conveyed by a first sequence of data packets, wherein the calculating of the first data chunk hash value may include receiving, by the hardware accelerator, a first packet of a sequence of packets that conveys the first data chunk; applying, by the hardware accelerator, a data chunk hash calculation process on the first packet to provide a first hash calculation result; for each received packet of the first sequence that follows the first packet repeating the stages of receiving the received packet by the hardware accelerator; and applying the data chunk hash calculation process on the received packet while taking into account a hash calculation result obtained when applying the data chunk hash calculation process on a last packet of the first sequence that preceded the received packet; wherein the calculating of the first data chunk hash value is initiated before a completion of a reception of the entire first data chunk by the hardware accelerator.

The method may include performing a comparison between the first data chunk hash value and hash values of data chunks already stored in a storage device.

The method may include determining whether to store the first data chunk in the storage device based on an outcome of at least the comparison.

The method may include storing each hash calculation result in a memory unit and fetching each hash calculation result before applying a data chunk hash process that is responsive to the hash calculation result.

The method may include using a reduced representation of the first data chunk hash value to access a data structure that stores hash values of data chunks already stored in the storage device.

The method may include determining not to store the first data chunk in the storage device if (a) the reduced representation of the first data chunk hash value matches a reduced representation of a hash value of a certain data chunk already stored in the storage device; and if (b) the hash value of the first data chunk matches a hash value of the certain data chunk.

The method further may include storing first data chunk metadata in a memory unit, wherein the first data chunk metadata may include (i) the hash value of the first data chunk, (ii) the reduced representation of the first data chunk hash value, and (iii) a match flag that is indicative of a relationship between the hash values of the first data chunk and of the data chunk that has the hash value that is pointed by the reduced representation of the first data chunk.

The method may include calculating hash values of multiple data chunks that are not associated to each other in an interleaved manner.

The method may include extracting data fragments from data payloads of packets of the first sequence.

The method may include applying the data chunk hash calculation process on a combination of (a) a data fragment of a received packet and (b) a residue from a last packet that preceded the received packet and belonged to the first sequence.

The method may include determining to calculate the first data chunk hash value when detecting that the first packet is included in an unsolicited transmission.

The detecting may be executed per a group of data chunks that are associated with each other—for example a group of data chunk that belong to a single message.

According to an embodiment of the invention there may be provided a system for in-band de-duplication, the system may include a hardware accelerator and a memory unit; wherein the hardware accelerator may be arranged to calculate a first data chunk hash value, wherein content of the first data chunk is conveyed by a first sequence of data packets, wherein the calculating of the first data chunk hash value may include receiving a first packet of a sequence of packets that conveys the first data chunk; applying a data chunk hash calculation process on the first packet to provide a first hash calculation result; for each received packet of the first sequence that follows the first packet repeating the stages of receiving the received packet by the hardware accelerator; and applying the data chunk hash calculation process on the received packet while taking into account a hash calculation result obtained when applying the data chunk hash calculation process on a last packet of the first sequence that preceded the received packet; wherein the calculating of the first data chunk hash value is initiated before a completion of a reception of the entire first data chunk by the hardware accelerator.

The system that may be arranged to perform a comparison between the first data chunk hash values of data chunks already stored in a storage device.

The system that may be arranged to determine whether to store the first data chunk in the storage device based on an outcome of at least the comparison.

The system wherein the memory unit may be arranged to store each hash calculation result and wherein the hardware accelerator is further arranged to fetch each hash calculation result before applying a data chunk hash process that is responsive to the hash calculation result.

The system may be arranged to use a reduced representation of the first data chunk hash value to access a data structure that stores hash values of data chunks already stored in the storage device.

The system may be arranged to determine not to store the first data chunk in the storage device if (a) the reduced representation of the first data chunk hash value matches a reduced representation of a hash value of a certain data chunk already stored in the storage device; and if (b) the hash value of the first data chunk matches a hash value of the certain data chunk.

The hardware accelerator may be arranged to send to the memory unit first data chunk metadata, wherein the first data chunk metadata may include (i) the hash value of the first data chunk, (ii) the reduced representation of the first data chunk, and (iii) a match flag that is indicative of a relationship between the hash values of the first data chunk and of the data chunk that has the hash value that is pointed by the reduced representation of the first data chunk.

The hardware accelerator may be arranged to calculate hash values of multiple data chunks that are not associated with each other in an interleaved manner.

The hardware accelerator may be arranged to extract data fragments from data payloads of packets of the first sequence.

The hardware accelerator may be arranged to apply the data chunk hash calculation process on a combination of (a) a data fragment of a received packet and (b) a residue from a last packet that preceded the received packet and belonged to the first sequence.

The hardware accelerator may be arranged to determine to calculate the first data chunk hash value when detecting that the first packet is included in an unsolicited transmission.

The detecting may be executed per a group of data chunks that are associated with each other.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
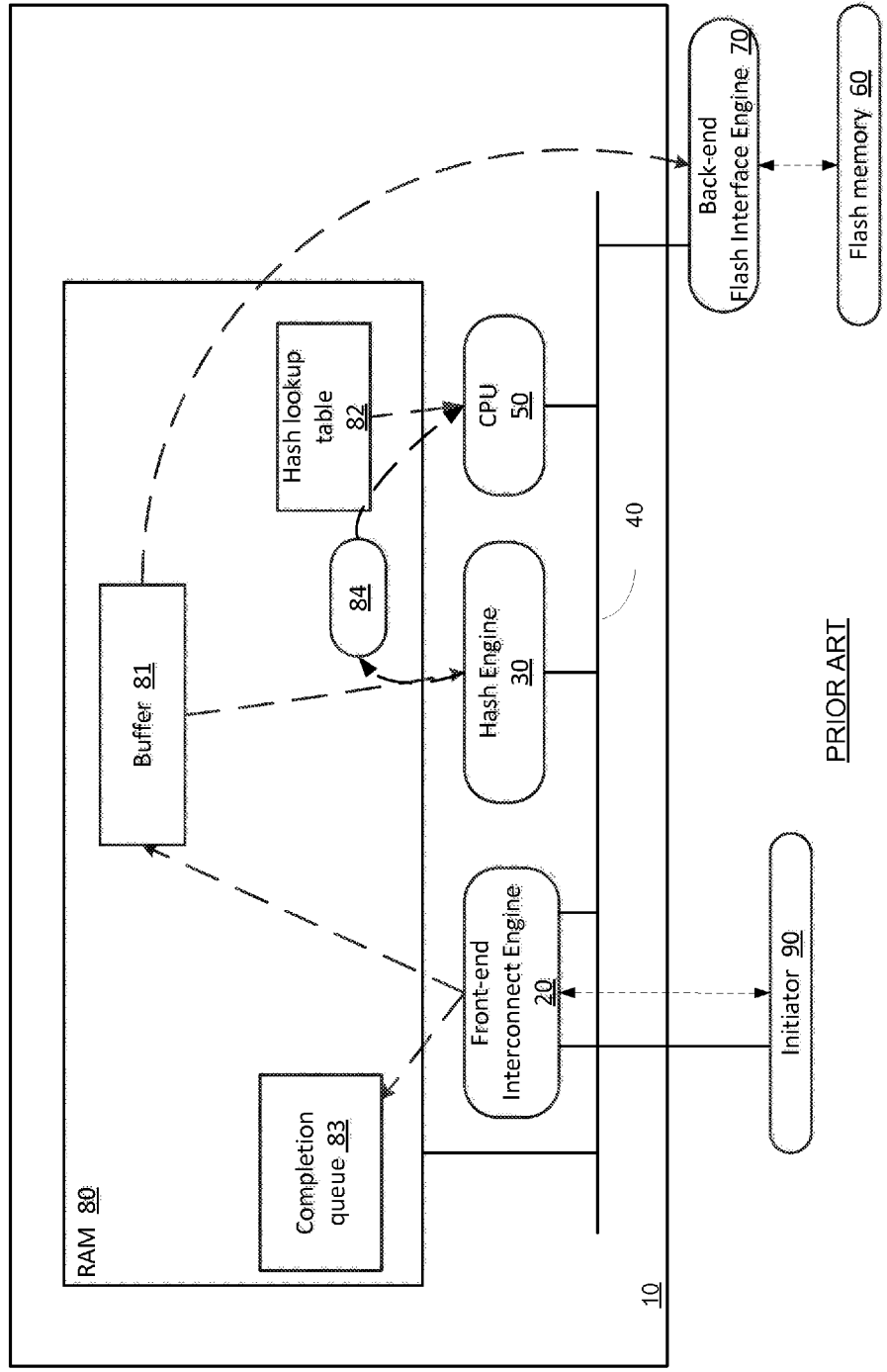
FIG. 1 illustrates a prior art system, an initiator, a flash memory and a back-end flash interface engine.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

Various examples may refer to a hash value or a hash calculating process. It is noted that these are only examples of a hash value and of a hash calculating processes.

The term "hardware accelerator" is an electrical component that includes one or more hardware elements that is capable of executing various processing operations thereby reducing a time required to complete a process.

The term "data chunk" is a unit of data that is conveyed by multiple packets. It may be of various sizes. It may include one or more pages. If may form a message or be a part of a message. A data chunk hash value is calculated per data chunk. It is noted that a packet can convey content of more than a single data chunk. Multiple data chunks can form a message and in this case these data chunks (that form the message) can be associated to each other.

Figure 2:
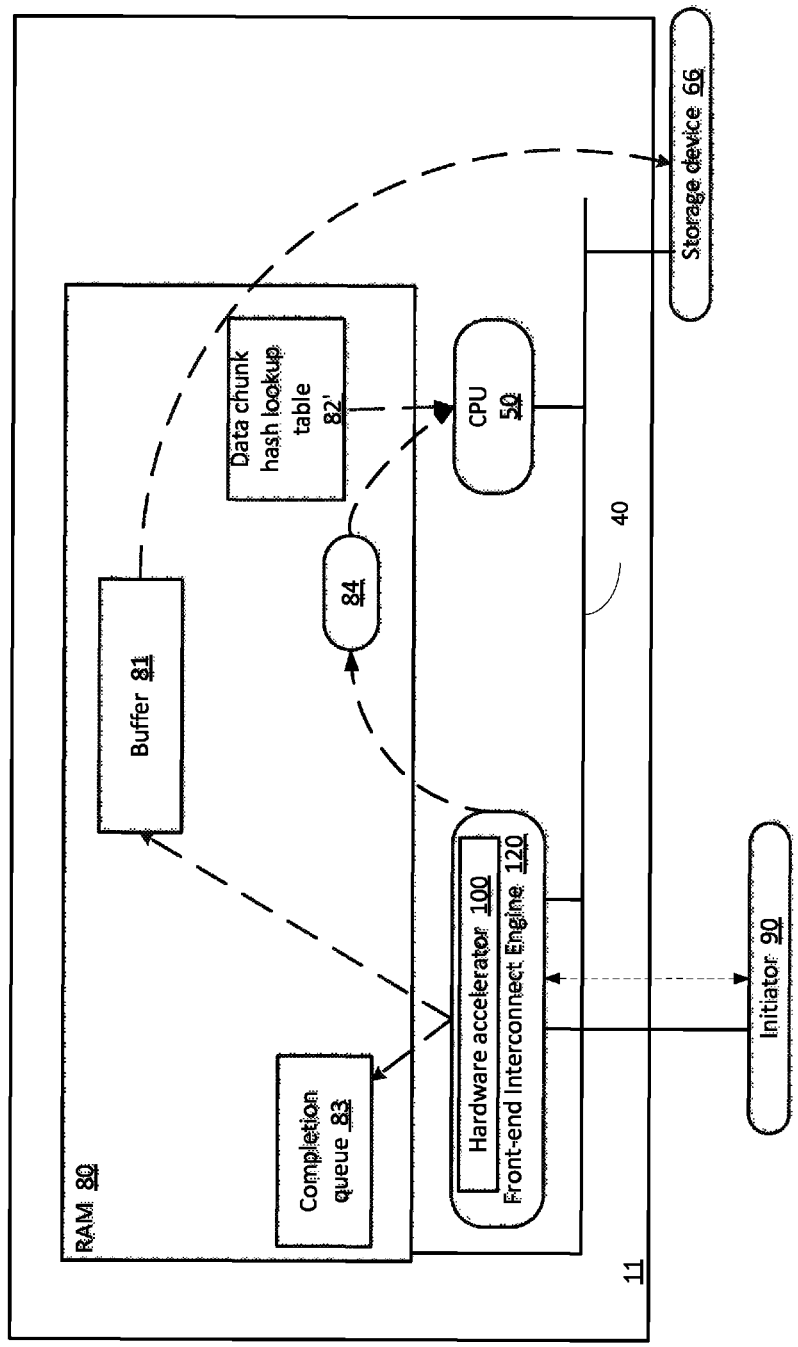
FIG. 2 illustrates a system, a data source and a storage device according to an embodiment of the invention.
Figure 3:
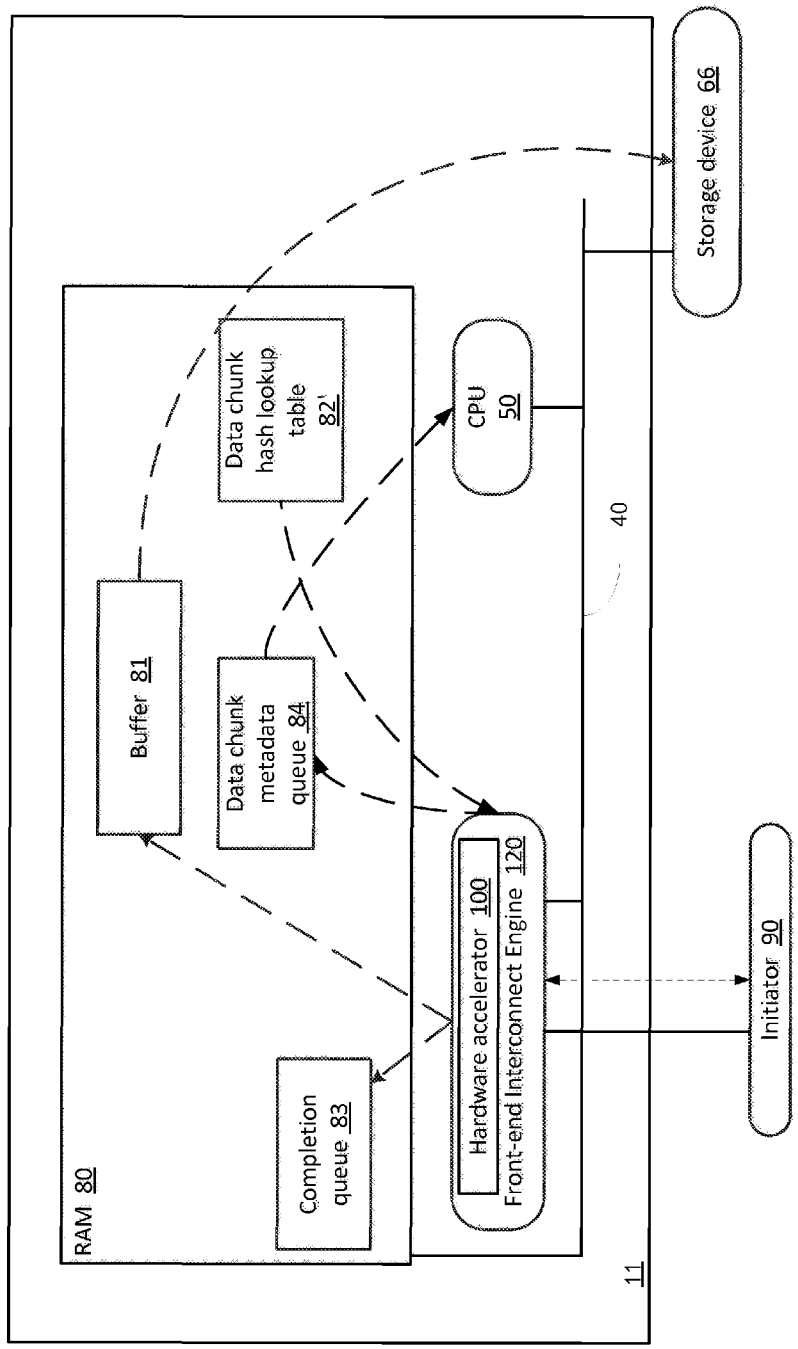
FIG. 3 illustrates a system, a data source and a storage device according to an embodiment of the invention.

FIGS. 2 and 3 illustrate system 11 according to an embodiment of the invention. System 11 is illustrated as being coupled to data source 90 and to storage device 66.

System 11 includes a front end interconnect engine 120 that includes hardware accelerator 100, a memory module such as RAM 80 and CPU 50. These elements are electrically coupled to each other by bus (or any link or network) 40.

The hardware accelerator 100 may be coupled to the front end interconnect engine 120.

RAM 80 stores buffer 81, a completion queue 83, received data chunk hash value buffer 84, and the hash lookup table 82'.

Front-end interconnect engine 120 receives packets from data source 90 and its hardware accelerator 100 performs various operations related to data de-duplication.

According to an embodiment of the invention a typical write process is illustrated by various dashed arrows in FIG. 2. A typical response may include:

Receiving by the front end interconnect engine 120 write command from data source 90.

Allocating buffer 81 in RAM 80.

Send packets from data source memory to buffer 81.

While the packets are received—and before all packets conveying the data of a received data chunk are received by the front-end interconnect engine 120—the hardware accelerator 100 starts to calculate a hash value for the received data chunk. The calculation does not require an access to buffer 81 and may be executed without accessing RAM 80. The calculation can be executed in an iterative manner—processing one data fragment after the other. The data fragment may be of a fixed size (See, for example data fragment 230(1)230(N) of FIG. 4) or a variable size (not shown). The data fragments may form only a part of the entire data chunk.

Once all the packets that conveyed data of the received data chunk are received, the hardware accelerator 100 can output the hash value of the entire received data chunk. That hash value can be stored in the data chunk hash buffer 84 or can be directly sent to CPU 50.

The CPU 50 may perform hash processing operations. This may include, for example, reading the received data chunk hash buffer and trying to find a matching hash value in the hash lookup table 82'.

If a match is not found—sending the received data chunk to the back-end flash interface engine 70 and from there to flash memory 60 and store the received data chunk hash value in the hash lookup table 82'.

If a match is found then storing a mapping from a received data chunk logical address to the physical address of the already stored matching data chunk.

According to various embodiment of the invention the hardware accelerator 100 may execute the hash processing or at least execute some operations of the hash processing operations. Various examples are provided in FIG. 6.

Various dashed arrows of FIG. 3 illustrate the hardware accelerator 100 as performing hash processing which involve searching for a matching hash value in the hash lookup table 82'—so that CPU 50 does not have to access RAM 80.

According to an embodiment of the invention the data packets that convey data of multiple data chunks are received in an interleaved manner so that packets associated with the same data chunk are received in a non-continuous manner.

Figure 4:
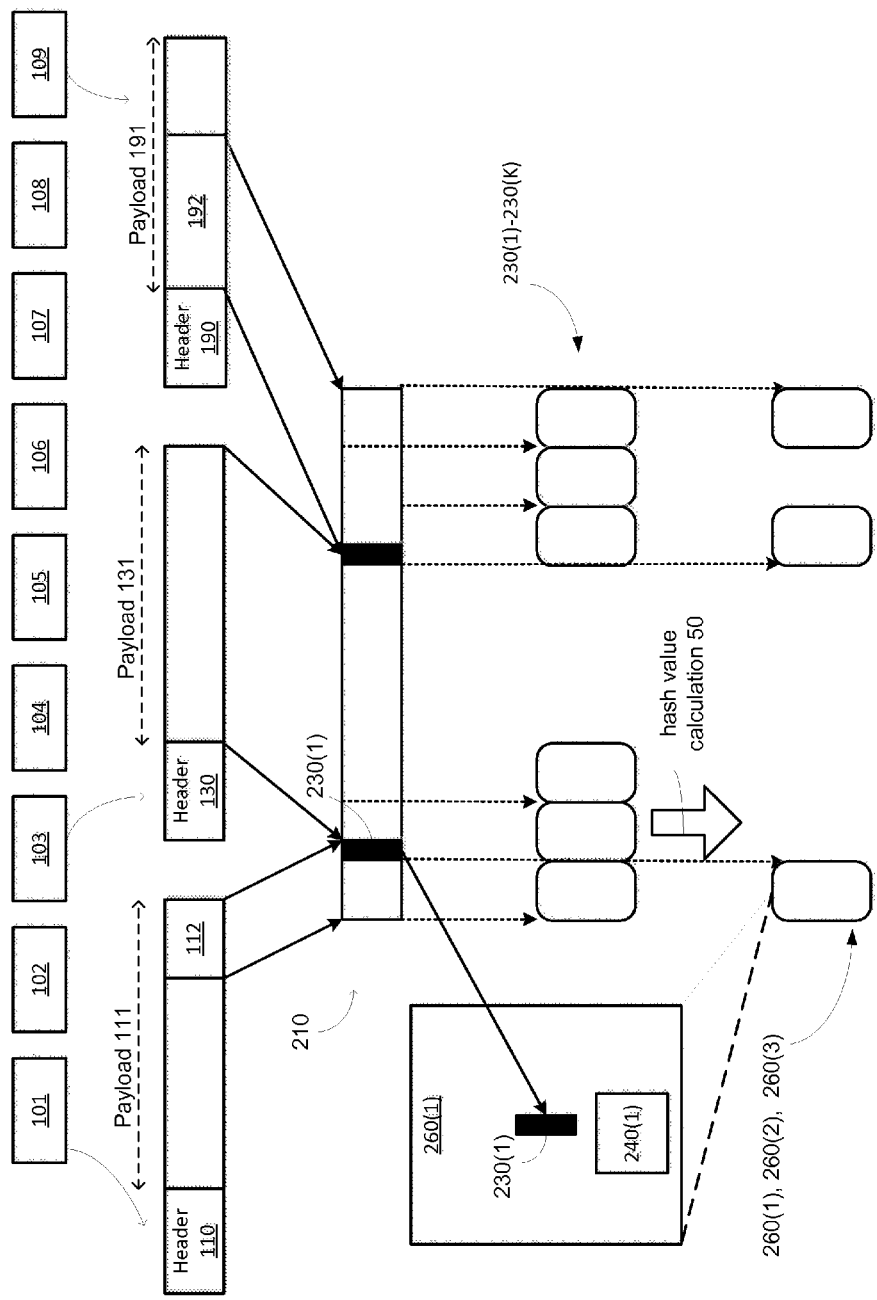
FIG. 4 illustrates multiple packets, and packet processing according to an embodiment of the invention.

FIG. 4 illustrates packets 101-109 in which packets 101, 103 and 109 convey data of the same data chunk (associated with the same transaction). In this case the hardware accelerator can switch between hash calculations of different data chunks while storing the state (also referred to as transaction context) of the hash calculation process just before each switch. This will allow the hardware accelerator 100 to resume the hash calculation process at the point it was ended. For example—and referring to FIG. 8—memory unit 460 of hardware accelerator 100 stores eight transaction contexts 260(n)-267(n) representing eight data chunks that have their hash value calculated concurrently (or in at least a partially overlapping manner).

Figure 5:
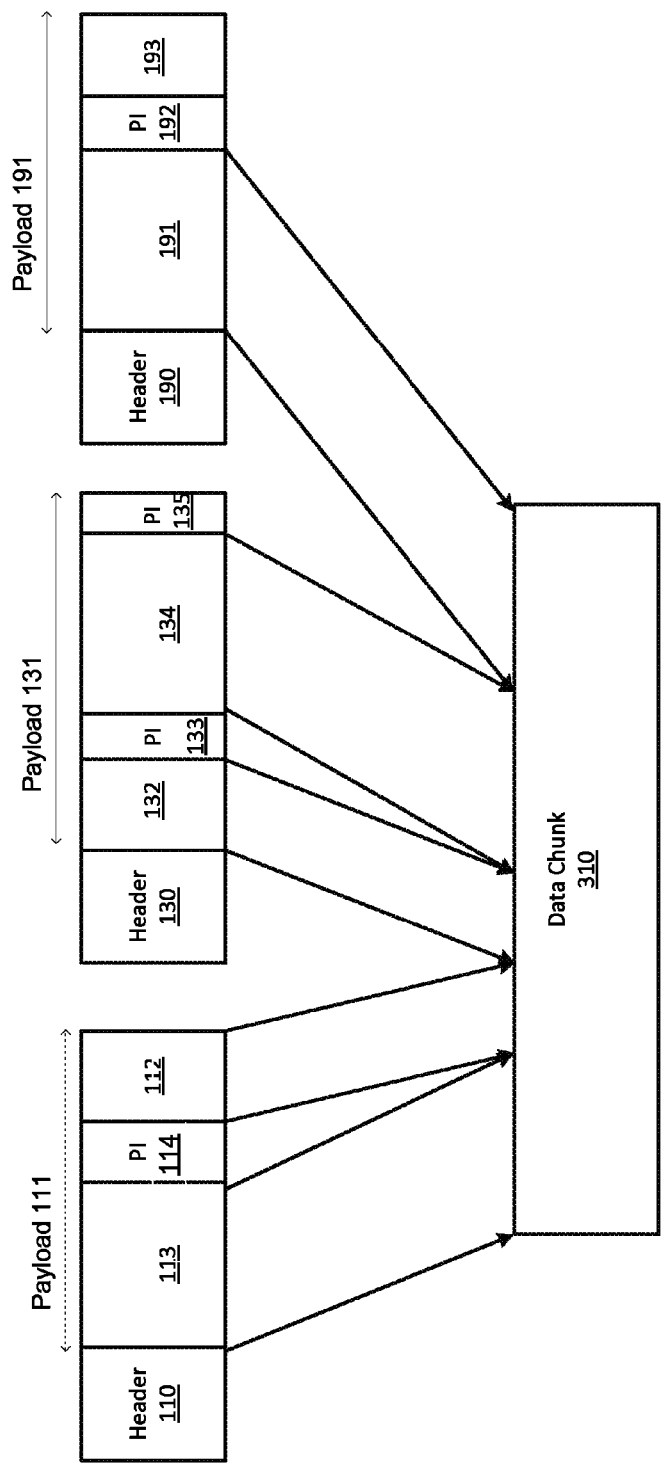
FIG. 5 illustrates multiple packets, and packet processing according to an embodiment of the invention.

FIGS. 4 and 5 illustrate multiple packets 100-109, and packet processing according to an embodiment of the invention.

FIG. 4 illustrates packets 101-109 that are received by front-end interconnect engine 120 and are fed to hardware accelerator 100 and to buffer 81.

Packets 101-109 are associated with (convey data belonging to) different data chunks. The hardware accelerator 100 calculates the hash value of the different data chunks in an iterative manner while switching from calculating of hash values of different data chunks.

FIG. 4 illustrates the hash calculation of a first data chunk that is embedded in first, third and ninth packets 101, 103 and 109. This hash calculation process is interrupted after processing first packet 101, is resumed to process third packet 103 and is resumed to process ninth packet 109 wherein at the end of the processing of ninth packet 109 the has hash value of the (entire) first data chunk is calculated by the hardware processor.

Assuming that first packet 101 is the first packet conveying data of the first data chunk (denoted 310 in FIG. 5) and the last packet that conveys data of the first data chunk is ninth packet 109, then the calculation of the first data chunk hash value includes:

Extracting all data fragments (such as data fragment 112) of the first packet 101 that should be processed during the first data chunk hash calculation process. This may include skipping fields in header, footer and the like (see, for example, skipping header 110, skipping security information PI 114, 133, 135 and 192 while maintaining data fragments 113, 112, 132, 134 and 191 of FIG. 5) and applying the first data chunk hash calculation process on the first data fragment to provide a first hash calculation result.

Storing a first transaction context 260(1) at the end of processing of all of the data fragments of the first packet. This first transaction context may include the first hash calculation result (240(1)) and may include a residue (230(1)) from data fragment 112. The residue may be formed if the data chunk hash calculation process operates on fixed size units (denoted 230(1)-230(K) in FIG. 4) and the aggregate size of data fragments that belong to a sequence of data packets is not a multiple integer of that fixed size.

Switching to a data chunk hash calculation process that involves processing data fragment that belong to data packet 102.

Switching back to the first data chunk hash calculation process.

Retrieving first transaction context 260(1)

Extracting all data fragments (from payload 131) of third packet 103 that should be processed during the first data chunk hash calculation process. This may include skipping fields in headers, footer and payload (see, for example skipping header 130) and applying the first data chunk hash calculation process on the data fragments extracted from third packet 103 to provide a second hash calculation result.

Storing the second transaction context 260(1) at the end of processing of all of the data fragments of the third packet 103. This second transaction context may include the second hash calculation result (240(1)) and may include a residue (230(1)) from data fragments of payload 131.

Switching to one or more data chunk hash calculation processes that involve processing data fragments that belong to data packets 104-108.

Switching back to the first data chunk hash calculation process.

Retrieving second transaction context 260(2)

Extracting all data fragments (denoted 192 and belonging to payload 191) of ninth packet 109 that should be processed during the first data chunk hash calculation process. This may include skipping fields in header, footer and the payload (see, for example skipping header 190) and applying the first data chunk hash calculation process on the data fragments extracted from ninth packet 109 to provide a third hash calculation result This stage may include padding a last fragment of the payload to match the size of the hash engine. No residue of the last fragment of the ninth packet 109 is generated—as it is the last packet of the data chunk.

Because the ninth packet 109 is the last packet that stores data fragments of the first data chunk then third hash calculation result is the hash value of the first data chunk. It can be sent to data chunk hash buffer 81 and/or can be stored in data chunk metadata queue 84.

Figure 11:
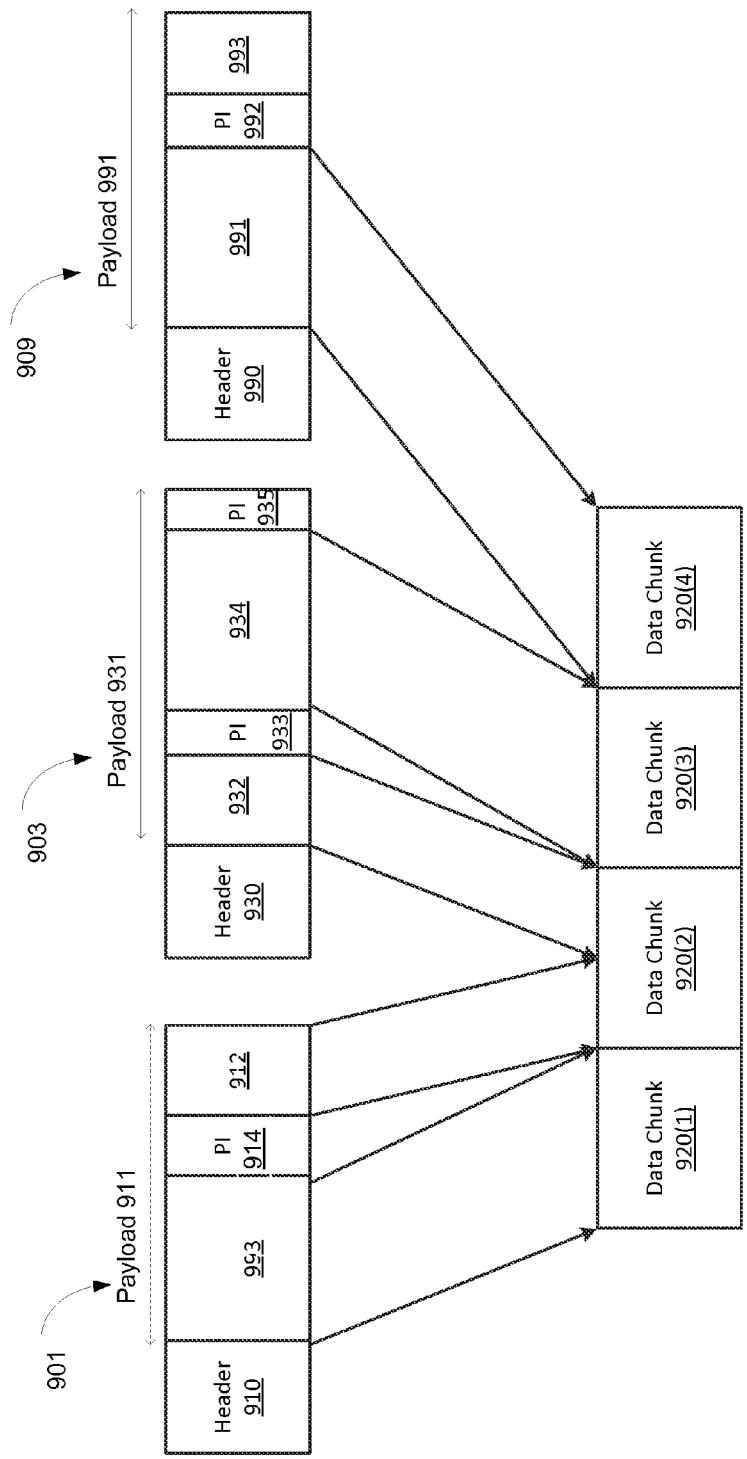
FIG. 11 illustrates multiple packets, and packet processing according to an embodiment of the invention.

It is noted that a packet can convey content taken from more than a single data chunk—as illustrated in FIG. 11 in which at least one of packets 901, 903 and 909 convey data that belongs to more than a single data chunk.

In FIG. 11 there are three packets 901, 903 and 909. The data fragment that is extracted to process the hash value of data chunk 920(1) includes portion 993 of the payload 911 of packet 901. The data fragments that are extracted to process the hash value of data chunk 920(2) include portion 912 of the payload 911 of packet 901 and portion 932 of the payload 931 of packet 903. The data fragment that is extracted to process the hash value of data chunk 920(3) includes portion 934 of the payload 931 of packet 903. The data fragment that is extracted to process the hash value of data chunk 920(4) includes portion 991 of the payload 991 of packet 909.

The extraction skips headers 910, 930, 990, and security information PI 914, 933, 935 and 992. Portion 993 of payload 991 does not belong to either one of data chunks 920(10-920(4).

After the first data chunk hash value is calculated it (the first data chunk hash) may be processed (by applying hash processing operations) to determine whether the first data chunk is already stored in the flash memory 60 or not. The hash processing may be executed by the hardware accelerator, the CPU or a combination of both.

This may include, for example, reading the received data chunk hash value and trying to find a matching hash value in the hash lookup table 82'. If a match is not found—sending the received data chunk to the storage device 66 and store the received data chunk hash value in the data chunk hash lookup table 82'.

If a match is found then storing a mapping from a received data chunk logical address to the physical address of the already stored matching data chunk. The mapping information may be included in the metadata column 82(2) of the data chunk hash lookup table 82'.

Figure 6:
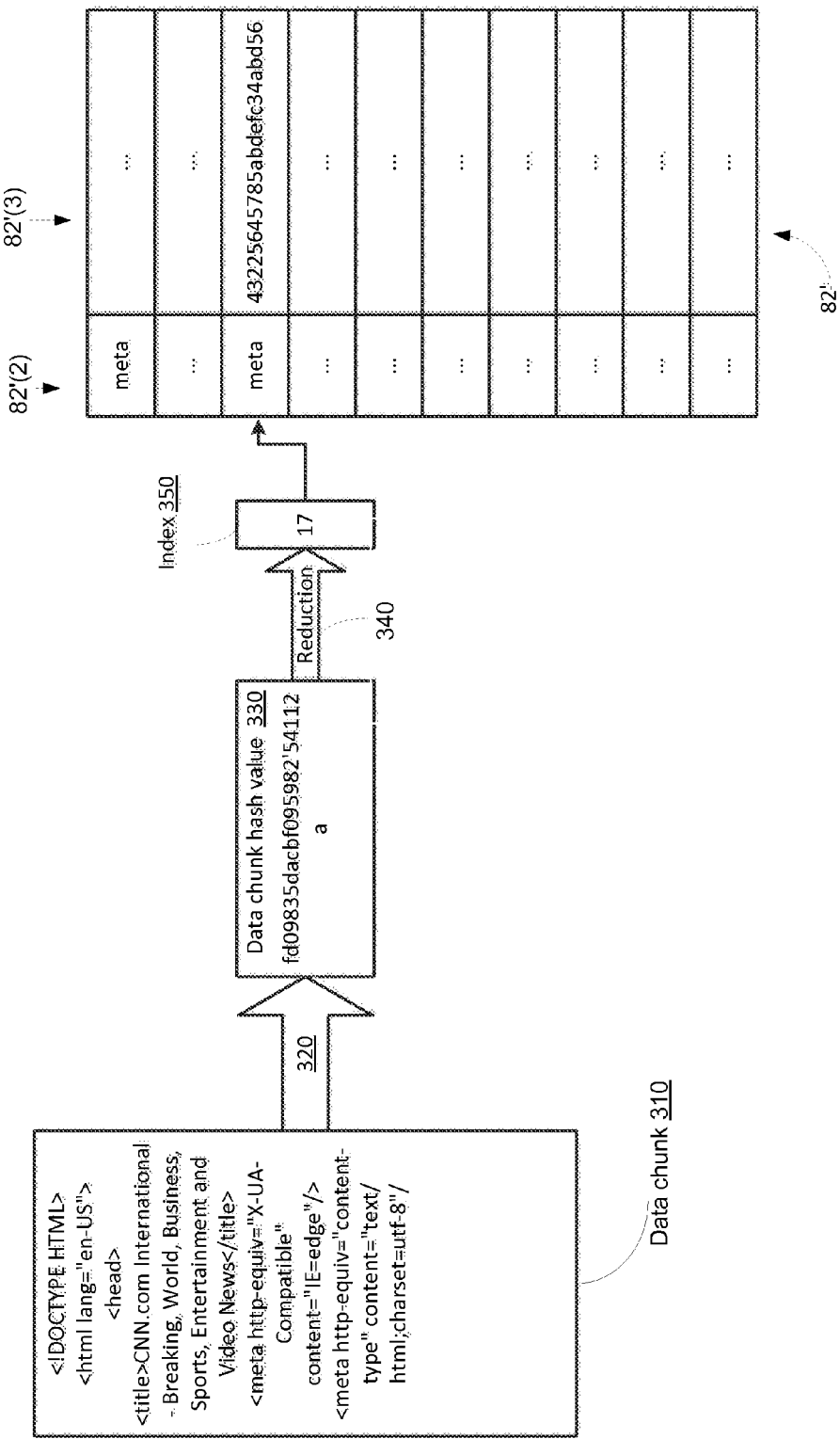
FIG. 6 illustrates hash processing according to an embodiment of the invention.

FIG. 6 illustrates a first data chunk 310 that is processed (by hashing 320) to provide a first data chunk hash value 330.

The first data chunk hash value 330 is reduced (340) to provide a reduced representation (index 350) of the first data chunk hash value. The value (17) of the index 350 is used to access the hash lookup table 82'. The hash lookup table 82' has several columns—one column (82'(3)) stores the hash values of the data chunks already stored in the storage device 66 and the other (column 82'(2)) stores metadata such as physical to logical address mapping.

It is noted that the hash lookup table 82' or any other data structure stored in RAM or in another memory module can include other fields such as index of the next entry in the lookup chain, or pointer to that entry, or location of additional metadata on flash device, etc. These other fields can be used by CPU, another processor or the hardware accelerator.

Figure 7:
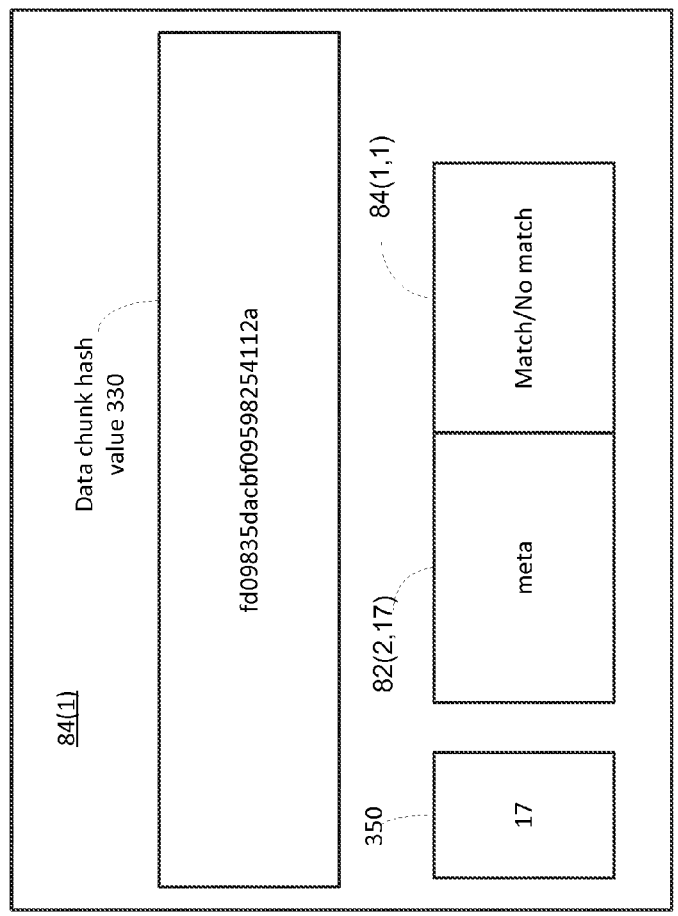
FIG. 7 illustrates data chunk metadata according to an embodiment of the invention.

FIG. 7 illustrates data chunk metadata according to an embodiment of the invention.

FIG. 7 illustrates a portion entry 84(1) of data chunk hash buffer 84. It stores first data chunk metadata that includes (i) the hash value 330 of the first data chunk, (ii) the reduced representation 350 of the first data chunk hash value, and (iii) a match flag 84(1,1) denoted "Match/No match") that is indicative of a relationship between the hash values of the first data chunk and of the data chunk that has the hash value that is pointed by the reduced representation of the first data chunk. It also stores metadata 82(2,17) such as a physical location of the first data chunk.

Figure 8:
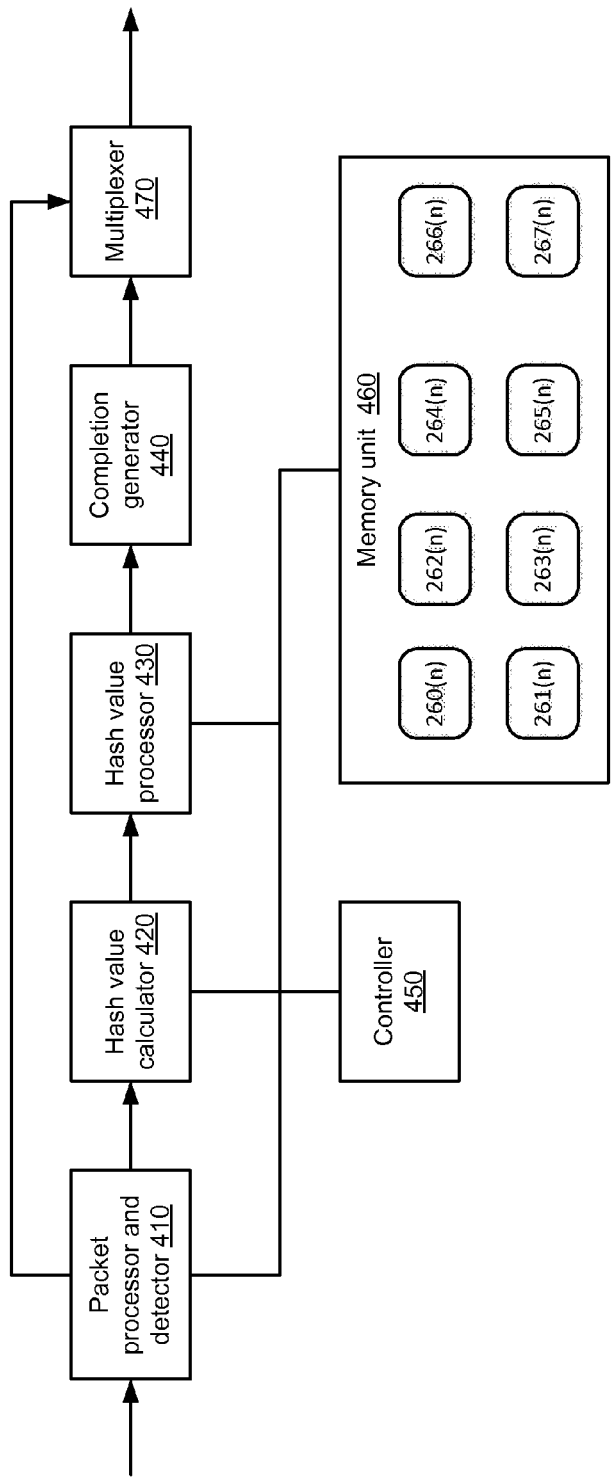
FIG. 8 illustrates the hardware accelerator of FIG. 3 according to an embodiment of the invention.

FIG. 8 illustrates the hardware accelerator 100 according to an embodiment of the invention.

Hardware accelerator 100 includes packet processor and detector 410, hash calculator 420, hash processor 430, completion generator 440, controller 450, memory unit 460 and multiplexer 470.

The packet processor and detector 410 may be arranged to detect packets that convey data chunks of interest. The detection can be made per message (especially when the message includes multiple data chunks) or per data chunk. It may detect unsolicited write messages (by searching known unsolicited data fields in packets) and/or detect packets of incoming DMA read responses. If a packet is irrelevant for the deduplication process it is outputted via multiplexer 470.

The packet processor and detector 410 also parses the packet and may either extract data fragments or assist in the process of the extraction. The extraction may include (see FIGS. 4 and 5 for example) skipping headers, security data and the like.

The hash processor 430 may be arranged to compare hash values of received data chunk hash values to those of data chunks already stored in storage device 66 and determine whether to store the received data chunk or not (see, for example, FIG. 6).

The completion generator 440 may send a completion indication (to be stored in completion queue 83) once each data chunks is received in its entirety.

The controller 450 may control the operation of these components.

Memory unit 460 may store transaction contexts such as 260(n)-267(n). These are fetched and stored during switching between hash calculations processes.

The hash calculator 420 performs the calculation of the hash values of data chunks. It can be done in an n iterative manner and may involve switching between data chunks hash calculation processes of different data chunks.

Figure 9:
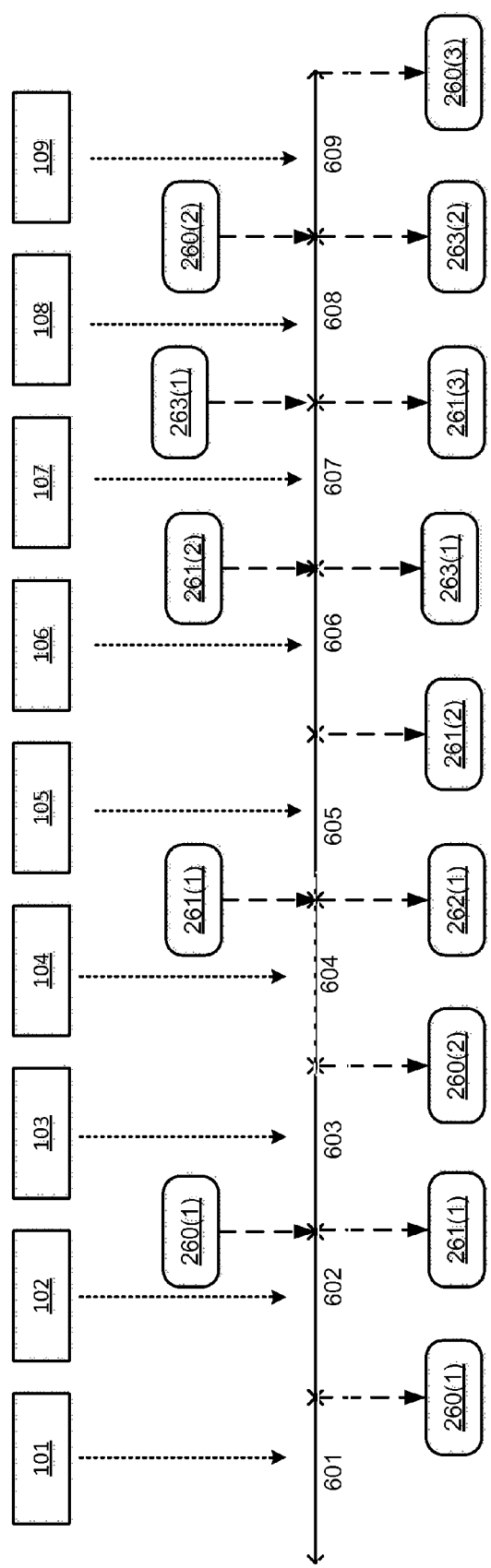
FIG. 9 illustrates multiple data chunks hash calculation processes according to an embodiment of the invention.

FIG. 9 and table 1 illustrates interleaved hash calculating processes according to an embodiment of the invention.

Referring to packets 100-109 of FIG. 4 it is assumed that: (a) data of a first data chunk is included in packets 101, 103 and 109; (b) data of a second data chunk is included in packets 102, 105 and 107; (c) data of a third data chunk is included in packet 104, (d) data of a fourth data chunk is included in packets 106 and 108.

TABLE 1

| Packet being processed | Data chunk hash calculating process | Generated transaction context | Fetched transaction context |
|---|---|---|---|
| 101 | 601 - beginning of first data chunk hash calculation process | 260(1) | None |
| 102 | 602 - beginning of second data chunk hash calculation process | 261(1) | None |
| 103 | 603 - continuation of first data chunk hash calculation process | 260(2) | 260(1) |
| 104 | 604 - beginning of third data chunk hash calculation process | 262(1) | None |
| 105 | 605 - continuation of second data chunk hash calculation process | 261(2) | 261(1) |
| 106 | 606 - beginning of forth data chunk hash calculation process | 263(1) | None |
| 107 | 607 - end of second data chunk hash calculation process | 261(3) | 261(2) |
| 108 | 608 - continuation of third data chunk hash calculation process | 262(2) | 262(1) |
| 109 | 609 - end of first data chunk hash calculation process | 260(3) | 260(2) |

Figure 10:
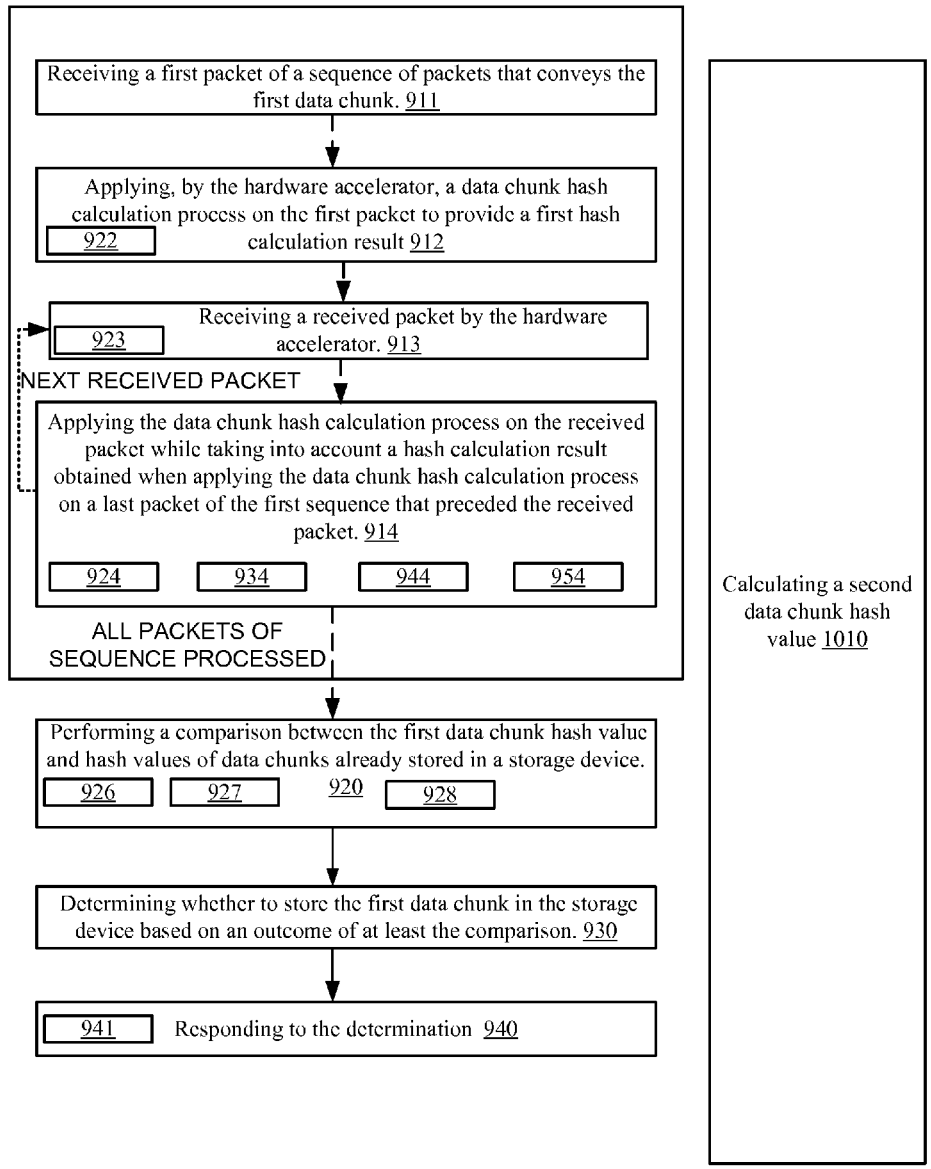
FIG. 10 illustrates a method according to an embodiment of the invention.

FIG. 10 illustrated method 900 for in-band de-duplication according to an embodiment of the invention.

Method 900 may start by stage 910 calculating a first data chunk hash value.

Method 900 may also include stage 1010 for calculating a second data chunk hash value and even equivalent stages (not shown) for calculating additional data chunks hash values in an interleaved manner (see for example FIG. 9 and table 1)—wherein the first and second data chunks are not associated with each other—for example may belong to the same message.

Stage 910 may include stage 911 of receiving a first packet of a sequence of packets that conveys the first data chunk.

Stage 911 is followed by stage 912 of applying, by the hardware accelerator, a data chunk hash calculation process on the first packet to provide a first hash calculation result. See, for example process 601 of FIG. 9 and first hash calculation result 260(1) of FIG. 9.

Stage 912 may include extracting (922) one or more data fragments from the first data packet 101 and the applying of the data chunk has calculation process can be performed on these one or more data fragments.

Stage 912 is followed by a set of stages that is applied for each received packet that belongs to the first sequence and follows the first packet.

The set of stages includes stages 913 and 914.

Stage 913 may include receiving a received packet by the hardware accelerator.

Stage 914 may include applying the data chunk hash calculation process on the received packet while taking into account a hash calculation result obtained when applying the data chunk hash calculation process on a last packet of the first sequence that preceded the received packet.

Referring to the example of FIG. 9, the processing of the third packet 103 takes into account the hash calculation result obtained when processing the first packet 101. The processing of the ninth packet 109 takes into account the hash calculation result obtained when processing the third packet 103.

Stage 914 may include extracting (944) one or more data fragments from each received packet and the applying of the data chunk hash calculation process can be performed on these one or more data fragments.

If the data chunk hash calculation process is executed in units that differ by size from the size of one or data fragments then stage 914 may include applying (954) the data chunk hash calculation process on a combination of (a) a data fragment of a received packet and (b) a residue from a last packet that preceded the received packet and belonged to the first sequence. See, for example, residual, residual 230(1) of FIG. 4—process 602 of FIG. 9 is applied on residual 230(1) of first packet 101 and on a part of third packet 103.

The calculating (910) of the first data chunk hash value is initiated before a completion of a reception of the entire first data chunk by the hardware accelerator.

If the processing of different packets of the same data chunks is executed in a non-continuous manner (see, for example, FIG. 9) then stage 914 may include storing (924) each hash calculation result in a memory unit and fetching (934) each hash calculation result before applying a data chunk hash process that is responsive to the hash calculation result. For example, referring to table 1, various hash calculation results are fetched and processed.

Stage 910 may be followed by stage 920 of performing a comparison between the first data chunk hash value hash values of data chunks already stored in a storage device.

Stage 920 may include generating (926) the information about the first data chunk hash value. An example is provided in FIG. 6—a reduced representation 350 of a hash value 330 of a first data chunk is created.

According to an embodiment of the invention the data chunks already stored in the storage device are arranged in data chunk hash lookup table (such as 82' of FIG. 2) that can be accessed by the reduced representations of data chunks hash values. Checking if the first data chunk is already stored may include using (927) the reduced representation of the first data chunk hash value to access the data chunk hash lookup table.

Additionally or alternatively, stage 920 may include comparing (928) between the reduced representation of the first data chunk hash value and reduced representations hash values of data chunks already stored in the storage device to determine whether there is a chance that the first data chunk hash value equals one of the data chunks already stored in the storage device. If there is no match (or a matching entry of the data chunks hash table is empty) then the data chunk can be written to the storage device.

Stage 920 may be followed by stage 930 of determining whether to store the first data chunk in the storage device based on an outcome of at least the comparison.

Stage 930 may include determining not to store the first data chunk in the storage device if (a) the reduced representation of the first data chunk hash value matches a reduced representation of a hash value of a certain data chunk already stored in the storage device; and if (b) the hash value of the first data chunk matches a hash value of the certain data chunk.

Stage 930 may be followed by stage 940 of responding to the determination. It may include storing the first data chunk, not storing the first data chunk, and the like.

Stage 940 may also include storing (941) first data chunk metadata in a memory unit, wherein the first data chunk metadata comprises (i) the hash value of the first data chunk, (ii) the reduced representation of the first data chunk hash value, and (iii) a match flag that is indicative of a relationship between the hash values of the first data chunk and of the data chunk that has the hash value that is pointed by the reduced representation of the first data chunk.

It is noted that one or more various stages (such as stages 920, 930 and 940) may not be executed by the hardware accelerator but may be executed by a CPU 50 or other processor able to execute instructions stored in a non-transitory computer readable medium.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for in-band de-duplication, the method comprising:
    calculating a first data chunk hash value, wherein content of the first data chunk is conveyed by a first sequence of data packets and the first data chunk is received in an interleaved manner with other data, and wherein the calculating of the first data chunk hash value comprises:
        receiving, by the hardware accelerator, a first packet of the first sequence of data packets that conveys the first data chunk;
        applying, by the hardware accelerator, a data chunk hash calculation process on the first packet to provide a first hash calculation result; and
        for each received packet of the first sequence that follows the first packet, repeating the stages of:
            receiving the received packet by the hardware accelerator; and
            applying the data chunk hash calculation process on the received packet while taking into account a hash calculation result obtained when applying the data chunk hash calculation process on a previous packet of the first sequence that preceded the received packet,
    wherein the calculating of the first data chunk hash value is initiated before completion of receiving the entire first data chunk by the hardware accelerator, and
    wherein the data chunk hash calculation process is applied on a combination of a data fragment of at least one received packet of the first sequence, and a residue from a previous packet that is part of the first sequence preceding the at least one received packet.

2. The method according to claim 1, further comprising performing a comparison between the first data chunk hash value and hash values of data chunks already stored in a storage device.

3. The method according to claim 2, further comprising determining whether to store the first data chunk in the storage device based on the comparison.

4. The method according to claim 1, further comprising storing each hash calculation result in a memory unit and fetching each hash calculation result before applying the data chunk hash process that is responsive to the hash calculation result.

5. The method according to claim 1, further comprising using a reduced representation of the first data chunk hash value to access a data structure that stores hash values of data chunks already stored in a storage device.

6. The method according to claim 5, further comprising determining not to store the first data chunk in the storage device: if the reduced representation of the first data chunk hash value matches a reduced representation of a hash value of a certain data chunk already stored in the storage device; and if the hash value of the first data chunk matches a hash value of the certain data chunk.

7. The method according to claim 5, further comprising storing first data chunk metadata in a memory unit, wherein the first data chunk metadata comprises: the hash value of the first data chunk; the reduced representation of the first data chunk hash value; and a match flag that is indicative of a relationship between the hash values of the first data chunk and of the data chunk that has the hash value that is pointed to by the reduced representation of the first data chunk.

8. The method according to claim 1, further comprising calculating hash values of multiple data chunks that are not associated to each other in an interleaved manner.

9. The method according to claim 1, further comprising extracting data fragments from data payloads of packets of the first sequence.

10. The method according to claim 1, further comprising determining to calculate the first data chunk hash value when detecting that the first packet is included in an unsolicited transmission.

11. The method according to claim 10, wherein the detecting is executed per groups of data chunks that are associated with each other.

12. A system for in-band de-duplication, the system comprising:

a hardware accelerator; and
a memory unit,
wherein the hardware accelerator is arranged to calculate a first data chunk hash value, wherein content of the first data chunk is conveyed by a first sequence of data packets and the first data chunk is received in an interleaved manner with other data, and wherein the calculating of the first data chunk hash value comprises:
receiving a first packet of the first sequence of data packets that conveys the first data chunk;
applying a data chunk hash calculation process on the first packet to provide a first hash calculation result; and
for each received packet of the first sequence that follows the first packet, repeating the stages of:
receiving the received packet by the hardware accelerator; and
applying the data chunk hash calculation process on the received packet while taking into account a hash calculation result obtained when applying the data chunk hash calculation process on a previous packet of the first sequence that preceded the received packet,
wherein the calculating of the first data chunk hash value is initiated before completion of receiving the entire first data chunk by the hardware accelerator; and
wherein the data chunk hash calculation process is applied on a combination of a data fragment of at least one received packet of the first sequence, and a residue from a previous packet that is part of the first sequence preceding the at least one received packet.

13. The system according to claim 12, wherein the system is arranged to perform a comparison between the first data chunk hash value and hash values of data chunks already stored in a storage device.

14. The system according to claim 13, wherein the system is arranged to determine whether to store the first data chunk in the storage device based on the comparison.

15. The system according to claim 12, wherein the memory unit is arranged to store each hash calculation result, and wherein the hardware accelerator is further arranged to fetch each hash calculation result before applying the data chunk hash process that is responsive to the hash calculation result.

16. The system according to claim 12, wherein the system is arranged to use a reduced representation of the first data chunk hash value to access a data structure that stores hash values of data chunks already stored in a storage device.

17. The system according to claim 16, wherein the system is arranged to determine not to store the first data chunk in the storage device: if the reduced representation of the first data chunk hash value matches a reduced representation of a hash value of a certain data chunk already stored in the storage device; and if the hash value of the first data chunk matches a hash value of the certain data chunk.

18. The system according to claim 16, wherein the hardware accelerator is arranged to send to the memory unit first data chunk metadata, and wherein the first data chunk metadata comprises: the hash value of the first data chunk; the reduced representation of the first data chunk; and a match flag that is indicative of a relationship between the hash values of the first data chunk and of the data chunk that has the hash value that is pointed to by the reduced representation of the first data chunk.

19. The system according to claim 12, wherein the hardware accelerator is arranged to calculate hash values of multiple data chunks that are not associated with each other in an interleaved manner.

20. The system according to claim 12, wherein the hardware accelerator is arranged to extract data fragments from data payloads of packets of the first sequence.

21. The system according to claim 12, wherein the hardware accelerator is arranged to determine to calculate the first data chunk hash value when detecting that the first packet is included in an unsolicited transmission.

22. The system according to claim 21, wherein the detecting is executed per groups of data chunks that are associated with each other.

* * * * *